US012367512B2

(12) United States Patent
Parekh et al.

(10) Patent No.: US 12,367,512 B2
(45) Date of Patent: *Jul. 22, 2025

(54) EXPOSING DEMAND SIDE PLATFORMS MECHANISM FOR BROADCAST RADIO

(71) Applicant: Jelli, LLC, San Mateo, CA (US)

(72) Inventors: Jateen P. Parekh, San Mateo, CA (US); Em Huynh, San Jose, CA (US)

(73) Assignee: Jelli, LLC, San Mateo, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/541,253

(22) Filed: Dec. 15, 2023

(65) Prior Publication Data

US 2024/0273579 A1 Aug. 15, 2024

Related U.S. Application Data

(63) Continuation of application No. 17/505,418, filed on Oct. 19, 2021, now Pat. No. 11,893,607.

(60) Provisional application No. 63/186,575, filed on May 10, 2021.

(51) Int. Cl.
*G06Q 30/0251* (2023.01)
*G06Q 30/0241* (2023.01)
*G06Q 30/0273* (2023.01)
*G06Q 30/08* (2012.01)
*H04H 60/06* (2008.01)

(52) U.S. Cl.
CPC ..... *G06Q 30/0275* (2013.01); *G06Q 30/0276* (2013.01); *G06Q 30/08* (2013.01); *H04H 60/06* (2013.01); *H04H 2201/11* (2013.01)

(58) Field of Classification Search
None
See application file for complete search history.

(56) References Cited

U.S. PATENT DOCUMENTS

| 10,085,073 | B2 | 9/2018 | Ray |
| 10,447,768 | B1* | 10/2019 | Parekh ................. H04N 21/812 |
| 10,796,333 | B1* | 10/2020 | Parekh ................. H04L 65/611 |
| 10,832,291 | B1* | 11/2020 | Kamireddy ...... H04N 21/23424 |
| 2008/0021792 | A1 | 1/2008 | Steelberg |
| 2008/0167957 | A1* | 7/2008 | Steelberg ........... G06Q 30/0277 |
| | | | 705/14.64 |
| 2009/0265235 | A1* | 10/2009 | Ha ......................... H04L 67/52 |
| | | | 705/14.57 |

(Continued)

FOREIGN PATENT DOCUMENTS

WO 2022018922 1/2022

OTHER PUBLICATIONS

G. A. Jones, J. M. Defilippis, H. Hoffmann and E. A. Williams, "Digital Television Station and Network Implementation," in Proceedings of the IEEE, vol. 94, No. 1, pp. 22-36, Jan. 2006, doi: 10.1109/JPROC.2005.861003. (Year: 2006).

*Primary Examiner* — Dipen M Patel
(74) *Attorney, Agent, or Firm* — Van Pelt, Yi & James LLP

(57) ABSTRACT

An indication to make a terrestrial broadcast ad spot associated with a terrestrial broadcast available for bid via a digital demand side platform is received. A bid request is sent to the digital demand side platform based at least in part on the indication. An indication of a winning bid for the terrestrial broadcast ad spot is received. A creative ad content associated with the winning bid is caused to be included in the terrestrial broadcast at a time associated with the terrestrial broadcast ad spot.

20 Claims, 13 Drawing Sheets

(56) References Cited

U.S. PATENT DOCUMENTS

| | | | |
|---|---|---|---|
| 2010/0145809 A1* | 6/2010 | Knapp | G06Q 30/08 705/14.71 |
| 2011/0131099 A1* | 6/2011 | Shields | G06Q 30/0275 705/14.71 |
| 2014/0026153 A1* | 1/2014 | Sorlander | G06Q 30/0275 725/5 |
| 2014/0136345 A1* | 5/2014 | Ringdahl | G06Q 30/0275 705/14.71 |
| 2014/0278981 A1 | 9/2014 | Mersov | |
| 2014/0337104 A1* | 11/2014 | Splaine | G06Q 30/0204 705/7.33 |
| 2016/0117720 A1* | 4/2016 | Hood | G06Q 30/0244 705/14.43 |
| 2020/0118160 A1* | 4/2020 | Ferreira et al. | F06Q 30/0244 705/14.71 |

\* cited by examiner

EXPOSING DEMAND SIDE PLATFORMS MECHANISM FOR BROADCAST RADIO

CROSS REFERENCE TO OTHER APPLICATIONS

This application is a continuation of U.S. patent application Ser. No. 17/505,418, entitled EXPOSING DEMAND SIDE PLATFORMS MECHANISM FOR BROADCAST RADIO filed Oct. 19, 2021 which is incorporated herein by reference for all purposes, which claims priority to U.S. Provisional Application No. 63/186,575, entitled EXPOSING PLATFORMS MECHANISM filed May 10, 2021 which is incorporated herein by reference for all purposes.

BACKGROUND OF THE INVENTION

Terrestrial broadcast networks such as those in radio and television offer advertising spots ("ad spots") to support operations. Placement of ad spots in broadcast networks is different from placement of ad spots in digital networks. Advertising allows an organization to proclaim their mission, assist in social causes, charitable, or public health causes, sell their goods/services, and/or develop brand recognition. Audio/video channels are popular channels to advertise on, as many consumers derive entertainment and news from audio/video channels, including linear terrestrial broadcast and digital streaming. Advertising allows an advertiser to integrate their ad spot within an audio/video program. It would be an improvement for these organizations to have an ability to better place an ad spot to the publisher that reaches their intended potential audience.

BRIEF DESCRIPTION OF THE DRAWINGS

Various embodiments of the invention are disclosed in the following detailed description and the accompanying drawings.

DETAILED DESCRIPTION

Figure 1:
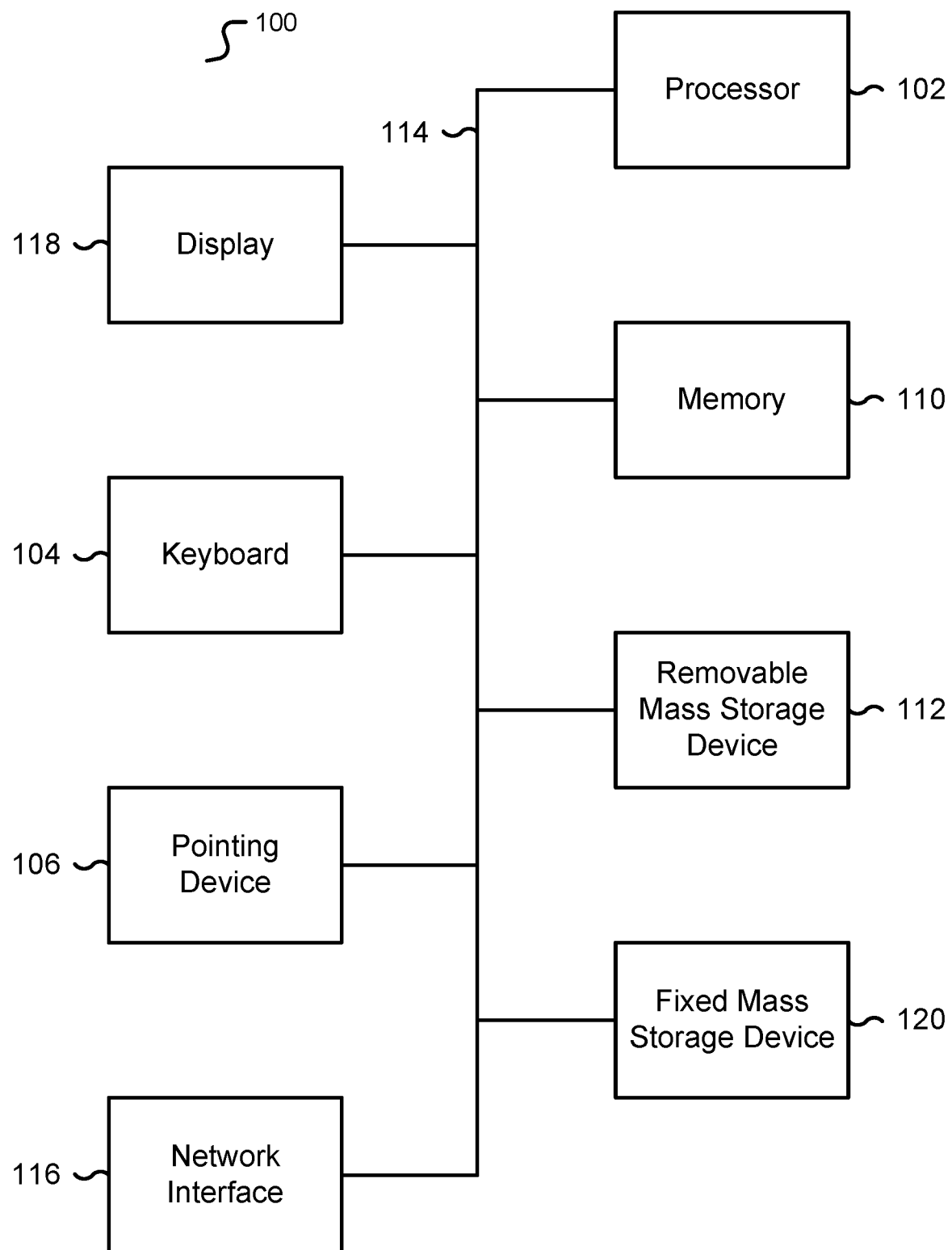
FIG. 1 is a functional diagram illustrating a programmed computer/server system for exposing platforms in advertising in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Allowing programmatic, digital ad buyers to purchase radio inventory alongside digital inventory is disclosed. Exposing terrestrial broadcast ad spot inventory programmatically to digital ad spot buyers using a digital demand side platform, including a self-service demand side platform, is disclosed. As referred to herein, "inventory" may refer to inventory of potential ad spots for a publisher, for example an online audio publisher of digital audio streaming, or broadcast audio publisher of linear terrestrial broadcast audio. The matching of ad spots to advertisements in a broadcast network differs from the matching in other media, such as digital network advertising, at least in part because of: the nature of planning broadcast schedules in advance; the indirect nature of determining demographics and other traits of a listener/viewer of the broadcast; dynamic pacing of ads to content; and the one-way, one-to-many, public nature of a broadcast network. Thus, a user of a digital demand side platform may not have exposure to a terrestrial broadcast network.

A "spot" as referred to herein represents a single play of a creative on-air on a single station. A "daypart" as referred to herein represents a time window within the schedule of a radio station, typically denoted as 'day(s) hours(s)', for example 'mo 5a-10a' represents the Monday morning drive.

As referred to herein, a "demand side platform" comprises: a platform for advertisers or their agents to interface with an ad exchange; an application store for picking ad networks and/or spot markets; an application store for data providers for applicable markets; allowing a different audience data book than that based on Nielsen and using that for planning; different RFP screens for different marketplaces/data; providing rich results and/or export of data; and enabling different ad campaign actions like canceling a campaign, replanning a campaign, splitting a campaign, and deleting a campaign. As referred to herein, a "self service" demand side platform is one that allows advertisers and ad agencies to directly interface with an ad exchange. Likewise a "supply side platform" as referred to herein comprises a platform for publishers or their agents to interface with an ad exchange.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. As referred to herein, "broadcasting" refers without limitation to the distribution of audio, video, and/or multimedia content in a one-to-many model via any electronic mass communications medium or combination of media including electromagnetic spectrum, over the air/terrestrial media, cable/coaxial/wired media, satellite transmission media, and/or computer readable media. Broadcasting may also refer to print broadcasting.

As referred to herein, "media" may refer to any form of information transmission, for example radio, television, other communication using electromagnetic waves, cable, and/or computer transmissions. As referred to herein, "users" may refer to any consumers of the content, including listeners and viewers of the content. As referred to herein, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, broadcast via dynamic billboards or signs, and streaming broadcast over internet protocols.

FIG. 1 is a functional diagram illustrating a programmed computer/server system for exposing platforms in advertising in accordance with some embodiments. As shown, FIG. 1 provides a functional diagram of a general purpose computer system programmed to expose platforms in advertising in accordance with some embodiments. As will be apparent, other computer system architectures and configurations may be used for exposing platforms in advertising.

Computer system (100), which includes various subsystems as described below, includes at least one microprocessor subsystem, also referred to as a processor or a central processing unit ("CPU") (102). For example, processor (102) may be implemented by a single-chip processor or by multiple cores and/or processors or by virtual processors. In some embodiments, processor (102) is a general purpose digital processor that controls the operation of the computer system (100). Using instructions retrieved from memory (110), the processor (102) controls the reception and manipulation of input data, and the output of data on output devices, for example network interface (116) or storage (120).

Processor (102) is coupled bi-directionally with memory (110), which may include a first primary storage, typically a random-access memory ("RAM"), and a second primary storage area, typically a read-only memory ("ROM"). As is well known in the art, primary storage may be used as a general storage area and as scratch-pad memory, and may also be used to store input data and processed data. Primary storage may also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) may include any suitable computer-readable storage media, described below, depending on whether, for example, data access needs to be bi-directional or uni-directional. For example, processor (102) may also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system (100), and is coupled either bi-directionally (read/write) or uni-directionally (read only) to processor (102). For example, storage (112) may also include computer-readable media such as flash memory, portable mass storage devices, holographic storage devices, magnetic devices, magneto-optical devices, optical devices, and other storage devices. A fixed mass storage (120) may also, for example, provide additional data storage capacity. The most common example of mass storage (120) is an eMMC device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) may be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a network interface (116), a keyboard and/or pointing device (104), as well as an auxiliary input/output device (106) interface, a sound card, microphone speakers, and other subsystems as needed. For example, the pointing device (104) can be a mouse, stylus, track ball, touch display, and/or tablet, and is useful for interacting with a graphical user interface.

The communication interface (116) allows processor (102) to be coupled to another computer, computer network, or telecommunications network using a network connection as shown. For example, through the communication interface (116), the processor (102) may receive information, for example data objects or program instructions, from another network, or output information to another network in the course of performing method/process steps. Information, often represented as a sequence of instructions to be executed on a processor, may be received from and outputted to another network. An interface card or similar device and appropriate software implemented by, for example executed/performed on, processor (102) may be used to connect the computer system (100) to an external network and transfer data according to standard protocols. For example, various process embodiments disclosed herein may be executed on processor (102), or may be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, may also be connected to processor (102) through communication interface (116).

In addition, various embodiments disclosed herein further relate to computer storage products with a computer readable medium that includes program code for performing various computer-implemented operations. The computer-readable medium is any data storage device that may store data which may thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that may be executed using an interpreter.

The computer/server system shown in FIG. 1 is but an example of a computer system suitable for use with the various embodiments disclosed herein. Other computer systems suitable for such use may include additional or fewer subsystems. In addition, bus (114) is illustrative of any interconnection scheme serving to link the subsystems. Other computer architectures having different configurations of subsystems may also be utilized, including virtual servers.

Figure 2A:
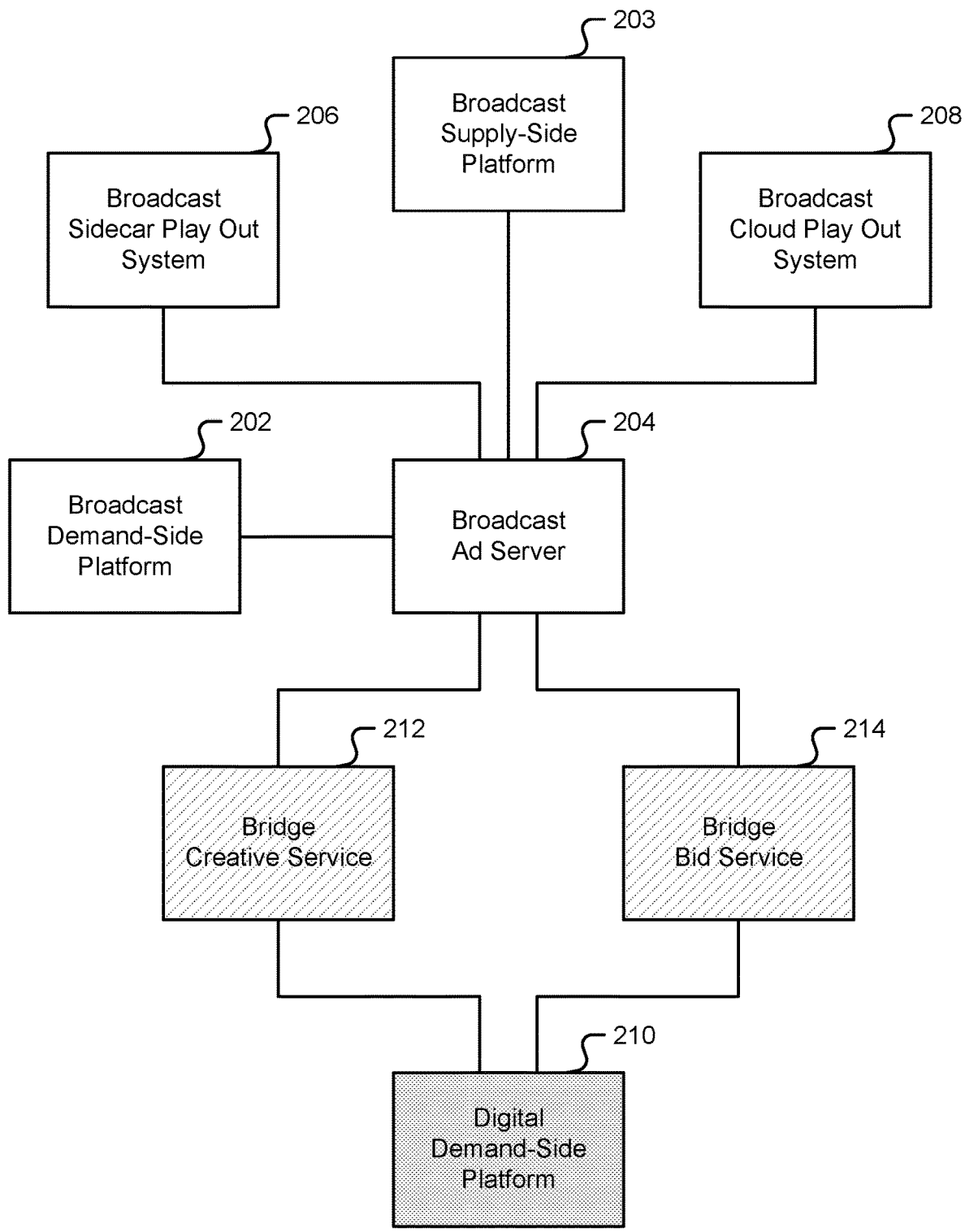
FIG. 2A is a block diagram illustrating an embodiment of a system for exposing broadcast ad spots for bid.

FIG. 2A is a block diagram illustrating an embodiment of a system for exposing broadcast ad spots for bid. In one embodiment, the blocks of FIG. 2A may each be represented by one or more computer/systems of FIG. 1 and/or a computer/system of FIG. 1 may service one or more blocks of FIG. 2A.

Broadcast demand side platform (202) is coupled to a broadcast ad server (204), allowing advertisers familiar with broadcast media to place ad spots offered by publishers who coupled to the broadcast ad server (204) via a broadcast supply side platform (203). The ad spots may be published at least in part by using a play out system at a broadcast radio tower/transmitter, for example a broadcast sidecar play out system (206) or a broadcast cloud play out system (208).

A broadcast sidecar play out system (206) comprises a physical appliance that is easily integrated in traditional radio broadcast stations and their radio towers, using for example an audio output interface configured to provide broadcast-ready audio to a local broadcast station. For example, the audio interface may use an STL (studio/transmitter link) input of a linear radio broadcast mixer for a linear radio broadcast station, wherein the audio output interface conforms to an AES (Audio Engineering Society) standard. The audio input interface may also receive broadcast-ready audio from a local output of the linear terrestrial radio broadcast mixer, for example where the audio input interface conforms to the AES standard and comprises an in-band communication wired interface configured to directly receive an audio output for the linear terrestrial radio broadcast. While a sidecar play out system (206) may use local storage such as that described FIGS. 1 (110), (112), and (120), a cloud play out system (208) may rely on cloud-based storage such as a storage service, object storage service, block storage service, persistent storage service, and/or database storage service.

A digital demand side platform (210) is a platform designed for advertisers familiar with digital media. Digital media tends to use real-time auctions/bidding in part due to the real-time ad spots, accurately described/targeted demographics, and the one-to-one private listening nature of digital media such as streaming and/or podcasts where each audience member may be targeted separately. A bridge bid service (214) and bridge creative service (212) is disclosed. The bridge bid service (214) "converts" in concept, form, and/or function a bid from a digital advertiser using digital demand side platform (210) in response to a bid request for a terrestrial broadcast ad spot. Similarly, a bridge creative service (212) "converts" in concept, form, and/or function a creative spot from a digital advertiser using digital demand side platform (210) to make digital creative suitable for terrestrial broadcast.

External and/or digital demand side platforms (210) operate using a protocol such as the RTB (real time bidding) protocol. This is typically different from terrestrial broadcast which is planned in advance. There are many versions of such protocols, including any protocol governed by the IAB (Interactive Advertising Bureau). A bid request may be sent out to one or more interested demand side platforms (202), (210), which allows them to respond with a bid price and other metadata. The bridge bid server (214) may at least in part be an RTB client to support multiple versions of RTB.

Figure 2B:
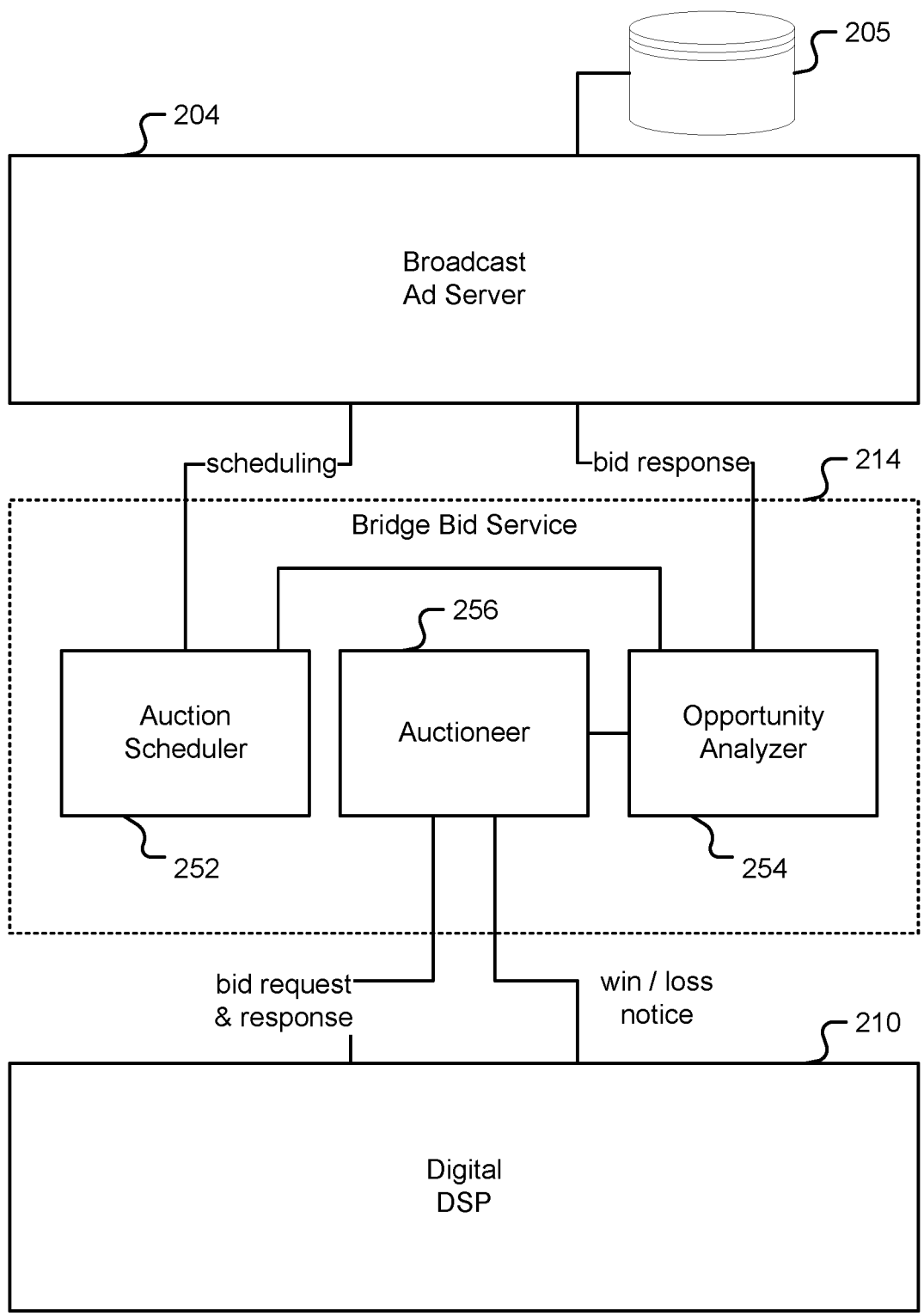
FIG. 2B is a block diagram illustrating an embodiment of a system for serving bids as a bridge to a digital demand side platform.

FIG. 2B is a block diagram illustrating an embodiment of a system for serving bids as a bridge to a digital demand side platform. In one embodiment, the blocks of FIG. 2B may each be represented by one or more computer/systems of FIG. 1 and/or a computer/system of FIG. 1 may service one or more blocks of FIG. 2B. In one embodiment, the bridge bid server (214) in FIG. 2A is the bridge bid server (214) of FIG. 2B.

Bridge bid server (214) comprises at least one of the following: auction scheduler server (252), opportunity analyzer (254), and auctioneer server (256).

The auction scheduler (252) may leverage an API (application programming interface) with the ad server (204) to pull spots that are set to play out in a future time frame. One advantage to this is that the ad server API is already based on timestamp instead of dayparts, so the AS may look for the next 5+ hours worth of plays, for example. Updates allow for cross station querying and a filter to only pull in "RTB" spots. This may avoid having a query for each active station individually.

A cache RDS, other ad server database, or other on-premise/off-premise/cloud-based database (205) may be used for the ad server (204) to store data and may be primarily read-only and yet denormalized. In one embodiment, the data is retrieved from an API to not couple two components to the same database. The auction scheduler (252) is responsible for identifying spots for analysis or to be set for action. A primary function is to retrieve all potential spots to be auctioned. There may also be multiple triggers for a spot to be auctioned. The auction scheduler (252) is for spots that are already scheduled, that is "guaranteed" as referred to herein. Once spots have been discovered, the auction scheduler (252) sends each one to the opportunity analyzer (254).

The opportunity analyzer (254) at least in part checks if a spot has already been auctioned off, or is in the process of being auctioned off. If the opportunity analyzer (254) determined the spot should be auctioned, it sends the spot to the auctioneer server (256). In one embodiment, the opportunity analyzer (254) includes logic to determine bid floors, white lists, black lists, impressions, and so forth.

Assuming that a spot is determined to a candidate for auction, the opportunity analyzer (254) sends the spot along with all necessary metadata to the auctioneer server (256). The auctioneer server (256) has the internal understanding or reference to metadata and configuration for any integrated demand side platform (210). The auctioneer server (256) may also have logic to either send to one or more demand side platforms (202), (210) sequentially or concurrently.

After all of the bid requests are sent, auctioneer server (256) may be responsible for waiting and analyzing the responses and determining a winner. All bidders may be sent a Win/Loss notice according to the RTB specs. The winning bidder may have their creative, which has been pre-approved, sent to the scheduler for airing.

The winning bidder (210) may send their creative ID within a bid response which would be received by bridge creative service (212). This may be in the form of VAST (video ad serving template) or some custom field, depending on the demand side platform (210). The creative may be already in the bridge creative system (212) and not a file to be downloaded.

The winning creative may go into a table and/or storage that identifies that specific spot with the winning creative/ agency/demand side platform/advertiser. In one embodiment, the play out system(s) (206), (208) need not deal with spot level detail, only dayparts in a rotation config. A broadcast scheduler looks at rotations and generates station dayparts which may not have spot specific information. The creative override may be overlaid on top of the existing schedule before being sent to the appliance (206), (208) or the ad server (204) via API.

The ad server (204) and/or bridge bid server (214) may support a guaranteed model, a non-guaranteed model, or both models.

Guaranteed Impressions. Providing a mechanism for transacting guaranteed deals for a set number of impressions is disclosed. In a guaranteed model as referred to herein, the number of spots to air, where, approximately when, and at what price are negotiated in advance of delivery. Each spot may be reserved for a specific deal and may not be purchased by another advertiser. As each spot is aired, the demand side platform (210) is notified through, for example, RTB protocols.

Although the number of impressions are guaranteed, the exact airing is "best effort". There may be events outside of radio station or organizing control that may impact one or more spots, for example natural disaster, public health/ political events, sporting events going into overtime, and programming cancellations. Spots that are missed due to these various reasons may be "made good" at a later time.

Non-Guaranteed Impressions. In a non-guaranteed model, providing the ability for demand side platforms (210) to bid on specific spots using an RTB protocol is disclosed. As referred to herein, in "non-guaranteed" model the pricing and deal parameters may be negotiated ahead of airing but spots are not reserved nor guaranteed for any specific buyer. A bid request may be sent to interested parties with various attributes and a winner may be selected based on the responses. "Evergreen" deals may be enabled as well, allowing multiple advertisers to bid on the spot. As referred to herein, an evergreen deal is one that is not restricted to new or live content, meaning that deals may occur in content that is "older", like podcasts, if the content is a good match.

Deal Negotiation. Under a guaranteed model, deal negotiation may occur offline and manually entered into a supply side platform (203), an associated entity with a publisher. A Deal ID may be provided by the demand side platform (210) for reference or the supply side platform (203) or associated entity may generate the ID and provide it to the demand side platform (210).

Integration using the RTB protocol may be primarily for backend reporting and reconciliation. In a non-guaranteed model, a deal API may be provided or consumed by the supply side platform (203) or associated entity to maintain synchronization of available deals. The same RTB integration may be leveraged to perform dynamic bidding on behalf of many advertisers. In this model, there may be multiple demand side platforms (202), (210) bidding for the same spot.

Figure 3A:
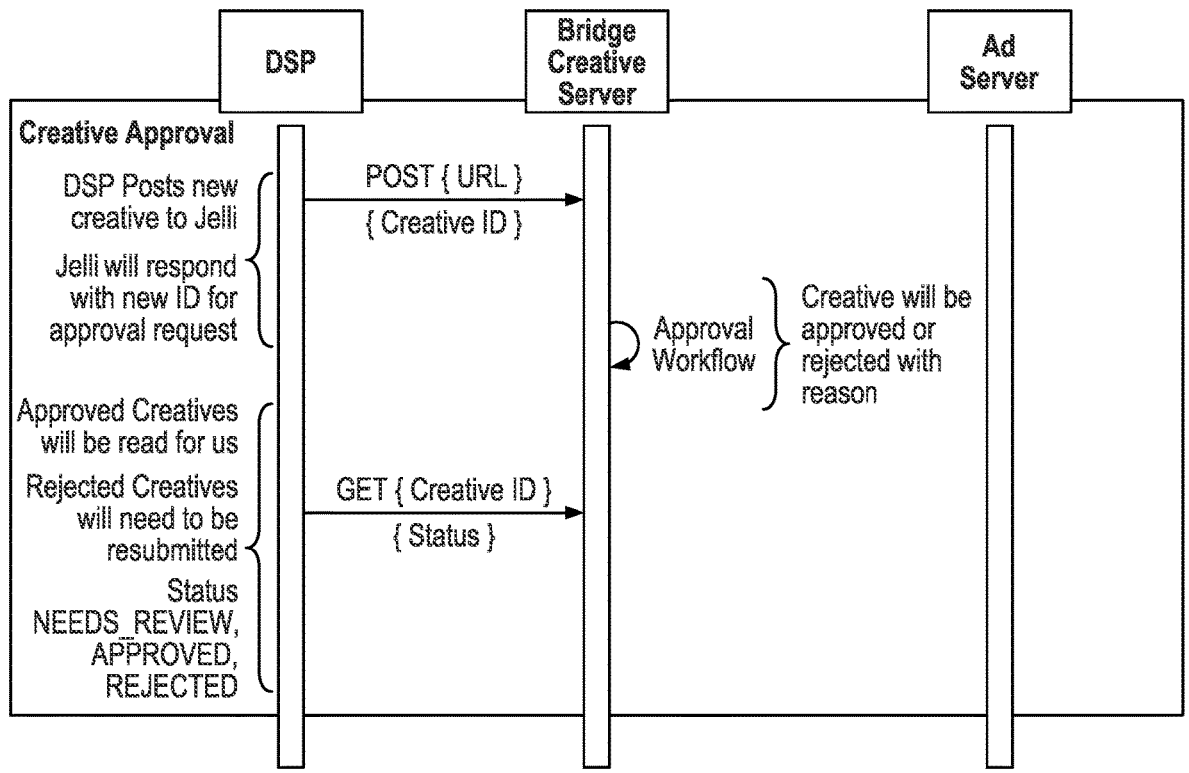
FIG. 3A is a diagram illustrating an example of creative approval.

Creative Approval API. FIG. 3A is a sequence diagram illustrating an example of creative approval. In one embodiment, creative approval as shown in FIG. 3A is carried out using the bridge creative server (212) of FIG. 2A. Broadcast, for example terrestrial radio, have unique and/or governmental requirements before being allowed to air. All audio creatives may be manually reviewed by the publisher associated with play out system (206), (208), and a creative approval API enables creatives to be submitted so they may be reviewed before airing. Note that unlike digital advertising, all creatives for terrestrial broadcast need be approved before they are able to be aired.

Two endpoints are provided to facilitate the creative approval process:
1) A single endpoint to submit a new creative for review. The creative may be supplied in the form of a downloadable URL along with metadata describing the creative, including ISCI and/or creative ID; and/or
2) A second endpoint to retrieve the status of the creative. This endpoint may be checked periodically until the creative is either approved or rejected.

If the event of a rejection, the caller may be supplied with the reason for rejection and may need to submit a new approval request once resolved.

Figure 3B:
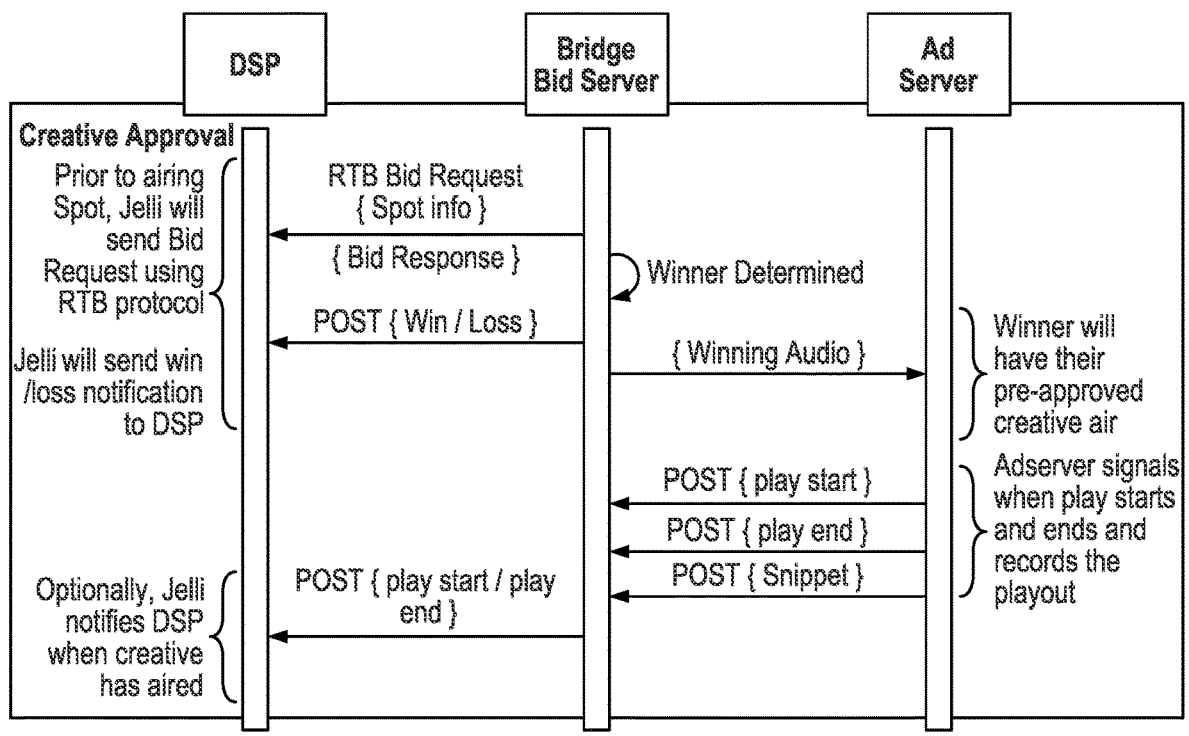
FIG. 3B is a diagram illustrating an example of bridging bids.

OpenRTB 2.5/3.0 Support. FIG. 3B is a sequence diagram illustrating an example of bridging bids. In one embodiment, bridging bids as shown in FIG. 3B is carried out using the bridge bid server (214) of FIG. 2A. A supply side platform (203) or associated entity may integrate with endpoints provided by the demand side platform (210) following the OpenRTB 2.5 or 3.0 specifications. The required data attributes and format may need to be agreed upon prior to integration. Examples of supply side platform format includes podcast, traditional radio, broadcast radio, linear radio, terrestrial radio, radio simulcast, streaming radio, music streaming, genre streaming, artist streaming, drop-in audio, live audio, live discussions, and video/OTT.

Prior to a spot going on-air, the supply side platform (203) or associated entity may send Bid Requests using the RTB protocol to the demand side platform (210). The supply side platform (203) or associated entity may also notify the demand side platform (210) if their bid was successful. This usually may be done two-five hours before the Spot is scheduled to play.

As part of the bid request, the supply side platform (203) or associated entity may provide the following attributes. In a non-guaranteed model, some attributes may be optional and may depend on the deal. Another description for a guaranteed model is that of a prebought spot.

| Attribute Name | Guaranteed | Non-Guaranteed |
| --- | --- | --- |
| # Audience Impressions | Provided | Provided |
| Bid Floor | Provided | Provided |
| Deal ID | Provided | Provided |
| Publisher | Provided | Optional |
| Market Identifier (DMA or MSA) | Provided | Optional |
| Station (FCC or Call Letters) | Provided | Optional |
| Daypart | Provided | Optional |

The bid response may contain the bid price along with the creative ID to air for the spot. In one embodiment, an algorithm and/or yield optimizer manages pricing. Not all inventory may be treated in the same way with regards to pricing and/or audience targeting. The supply side platform (203) or associated entity may support the VAST format or another negotiated format. Optionally, the supply side platform (203) or associated entity may send a notification when the spot has aired.

Reporting and/or Billing. A demand side platform (202), (210) may see standard reporting metrics in real-time to help understand how delivery is occurring across all their channels:
1. Impressions/Multiplier
   a. P12+ Impressions/multiplier
   b. SmartAudio Impressions/multiplier
   c. Nielsen Impressions
2. Time
   a. Broadcast week
   b. Daypart
   c. Broadcast day/time (In case the event is not real-time)
3. Location
   a. State
   b. Market DMA
   c. Market MSA
4. Type of Music/Station
   a. Station call letters
   b. Station format
   c. Station Rank
   d. Market Rank
5. Creative
   a. Creative that was run The improvements of FIG. 2A include:
1. Allowing self service, programmatic, radio ad buyers to purchase digital inventory alongside radio inventory;
2. Allowing self service, programmatic, digital ad buyers to purchase radio inventory alongside digital inventory;
3. Aggregation, deduplication, and/or calculating to roll up inventory into buyer goals, for example GRPs for radio buyers, impressions for digital buyers;
4. Using internal and external data sources to create audience targeting models for the combination of radio and digital inventory;

5. Other inventory packaging such as contextual that is supported;
6. In addition to the forecast data above, there is execution, pacing, and changes during flight that may occur. During execution delivery may be tracked across the various audio format types and buying types such as RTB, guaranteed, and so forth; and
7. Pacing and real time reporting of delivery using impressions, GRPs, and other metrics that buyers are comfortable with.

Figure 4:
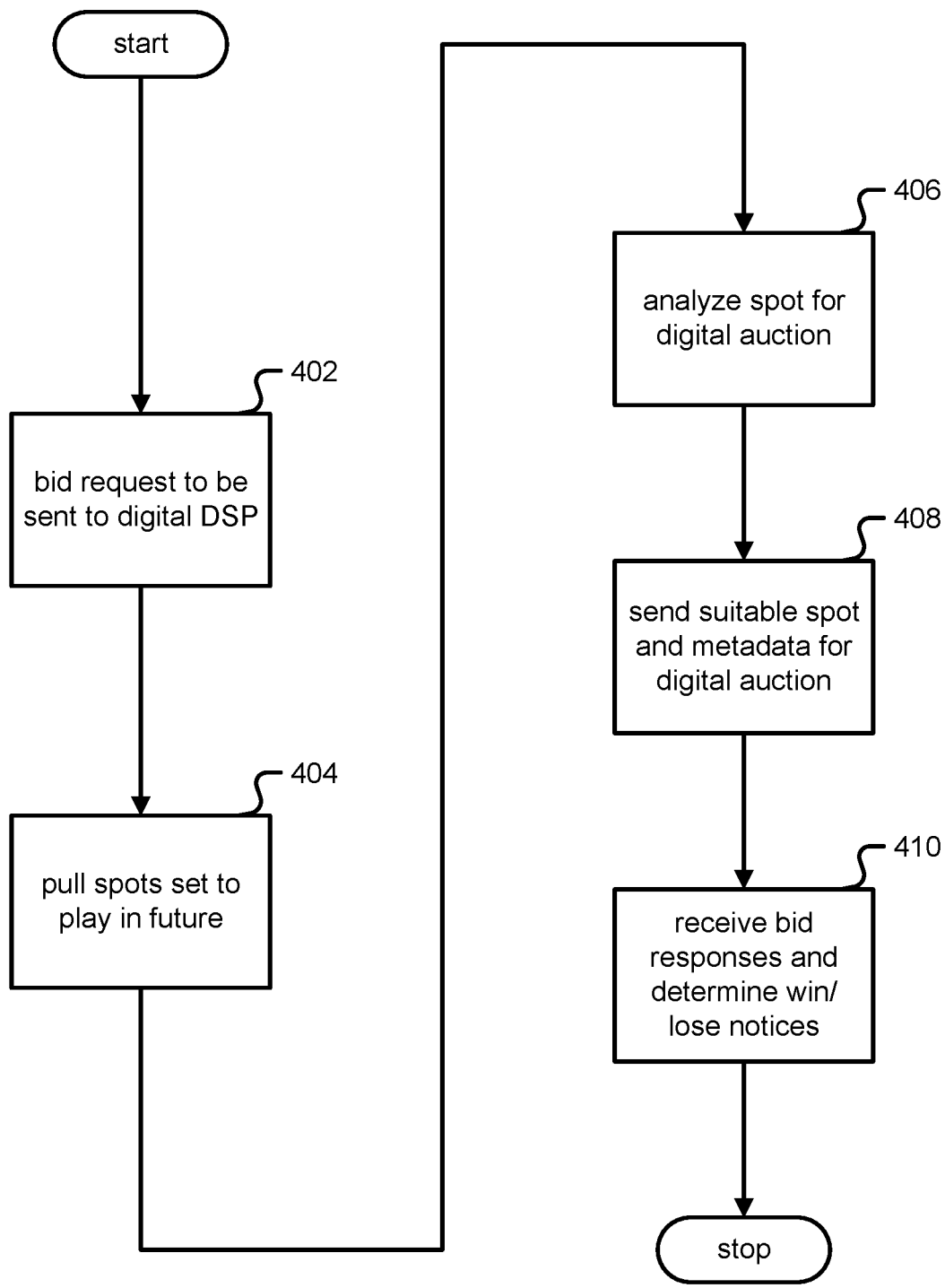
FIG. 4 is a flow diagram illustrating an embodiment of a process for exposing broadcast ad spots for bid.

FIG. 4 is a flow diagram illustrating an embodiment of a process for exposing broadcast ad spots for bid. In one embodiment, the process of FIG. 4 is carried out by a portion of, one, or more computer/systems of FIG. 1, for example the bridge bid server (214) in FIG. 2A.

In step (402), a bid request is determined to be sent to one or more digital DSPs. Using a digital DSP protocol, for example RTB, responses are allowed with a bid price and other metadata. In one embodiment, a response may include a spot RFP (request for proposal) including one or more of the following: budget, target audience, flight date(s), geographic constraints, and other constraints. An RTB client may be used which is its own client to support multiple versions of RTB. Once the bid request is determined to be sent, steps (404)-(410) detail how to carry out the bid request.

In step (404), spots are pulled set to play in the future. For example, an auction scheduler (252) from FIG. 2B may leverage an API for the ad server (204) to pull spots that are set to play out in a future time frame. One advantage to this is that an ad server API may be based on timestamp instead of abstracted dayparts so the auction scheduler (252) may expose the next hours' worth of plays, for example five hours' worth of plays.

In one embodiment, there are updates to either allow for cross station querying or a filter to only pull in RTB spots. This may avoid having a query for each active station individually. In one embodiment, a database such as the cache RDS (205) in FIG. 2B may be where the ad server API keeps data and may be primarily read-only writing and yet denormalized. In one embodiment, data is retrieved from an API to reduce coupling of two components to the same database.

In one embodiment, spots are identified for analysis or to be set for action, for example using the auction scheduler (252). One primary function is to retrieve all potential spots to be auctioned. There may also be multiple triggers for a spot to be auctioned. In one embodiment, the auction scheduler (252) is used for spots that are already scheduled, or guaranteed. Once spots have been discovered, the auction scheduler (252) may sends each spot to a system like the opportunity analyzer (254) in FIG. 2B.

In step (406), a spot is analyzed for a digital auction. For example, the opportunity analyzer (254) may check if the spot has already been auctioned off, or is in the process of being auctioned off. If the spot should be auctioned, it may send the spot forward to step (408), for example to the auctioneer (256) of FIG. 2B. In one embodiment, the analysis of step (406) includes determining bid floors, white lists, black lists, and impressions.

In step (408), with a spot determined to be a suitable candidate for digital auction, the suitable spot along with any appropriate metadata is sent forward, for example to the auctioneer (256). There may be an internal understanding or reference to metadata and configuration for any DSPs that are previously integrated. The bid request spot may be sent to one or more DSPs sequentially or in parallel.

In step (410), after all of the bid requests are sent, bid responses are received in sequence or in parallel, and analyzed to determine a winner. Win/lose notices are determined, and all bidders may be sent a win/lose notice according to an RTB specification. The winning bidder may have their creative, which has been pre-approved, sent to a scheduler for airing.

The winning bidder may send their creative ID (identifier) within the bid response. This may be in the form of a VAST (video ad serving template) or some custom field, depending on the DSP. The creative may be already in the system and not a file to be downloaded. The winning creative may go into a database, table, or storage that identifies that specific spot with the winning creative/agency/DSP/advertiser. In one embodiment, a sidecar play out system (206) and/or cloud play out system (208) as shown in FIG. 2A does not deal with spot level detail, only dayparts in the rotation config.

For example, a broadcast scheduler may look at rotations and generates station dayparts which may not have spot specific information. Creative override may be overlaid on top of the existing schedule before being sent to a play out system (206), (208) and/or via an ad server (204) API.

Figure 5:
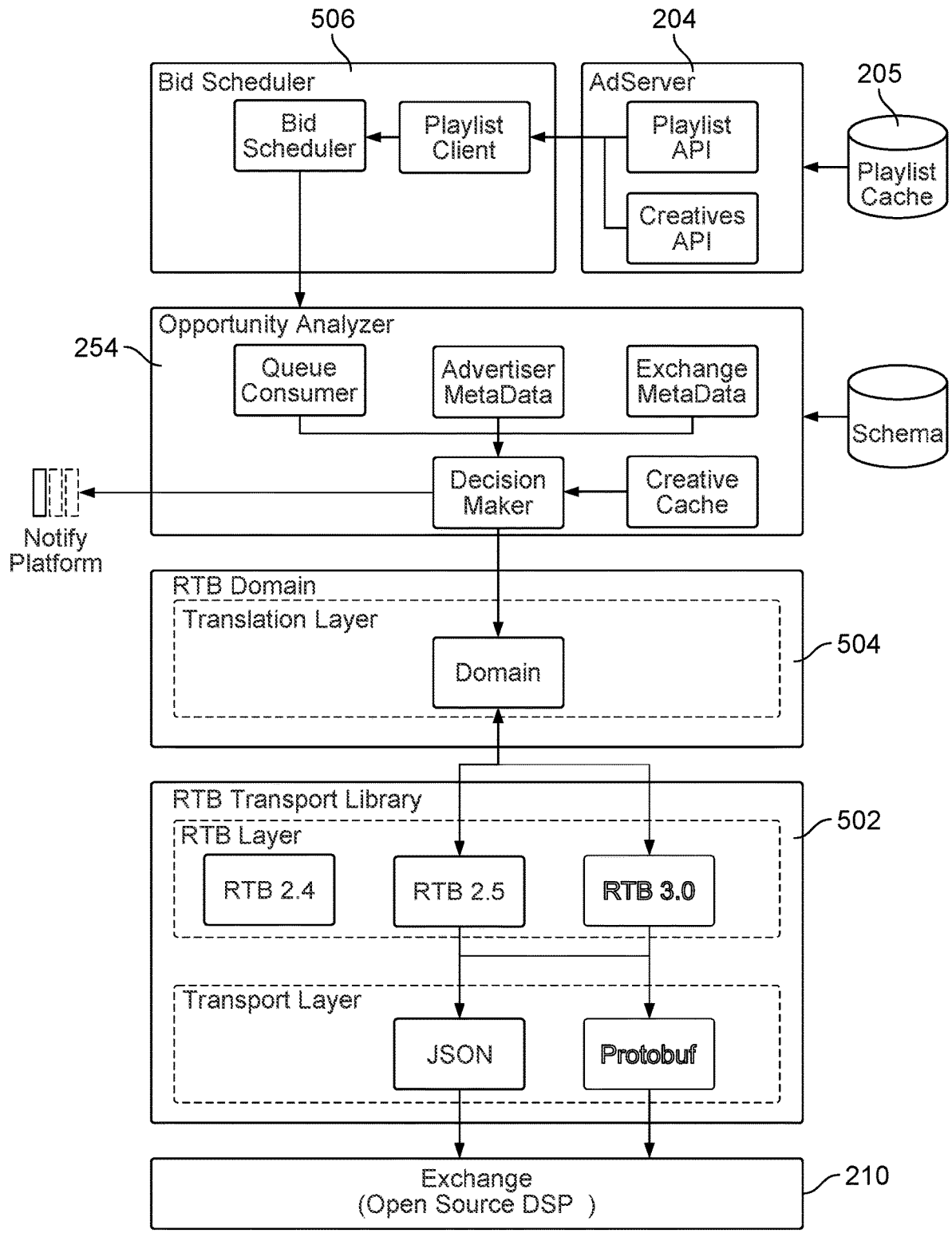
FIG. 5 is a block diagram illustrating an embodiment of a system for serving bids as a bridge to a digital demand side platform using protocol translation.

FIG. 5 is a block diagram illustrating an embodiment of a system for serving bids as a bridge to a digital demand side platform using protocol translation. In one embodiment, the digital DSP (210), opportunity analyzer (254), and ad server (204) are similar to those shown in FIGS. 2A and/or 2B.

In one embodiment, an RTB transport library (502) is an artifact that understands how to communicate via the RTB protocol. It takes an RTB object and translates it to either JSON, Protobuf, Avro, and so on, depending on what the digital DSP (210) supports. This may permit a client to perform external tests and/or communications. A prototype may run using a local client and/or JUnit may be written to test the RTB protocol.

The client may support external configuration for endpoints, hosts names, credentials/auth, and so on. The client library may be configured to hit an RTB compatible endpoint regardless of DSP (210). Placing the attributes into the right format and in the right attribute may be the responsibility of the RTB domain library (504), which is a user of the RTB transport library (502).

The RTB domain (504) houses logic and/or mappings to translate terrestrial broadcast values into RTB attributes for a target DSP (210). Each DSP (210) may require some customization to the actual values being sent and what fields need to be populated. The RTB domain (504) handles this by encompassing the logic and behavior to be negotiated with the DSP (210).

For example, a DSP (210) may want "bid floor" to be in USD or in a certain field, others may want it in a different format. The property used to specify the audience or number of impressions may also differ for a DSP (210). The opportunity analyzer (254) coupled to the RTB domain (504) may have access to the metadata needed to make a decision, for example, to:

send the bid request or not;
send it to one or more DSPs (210); and/or
filter what advertisers/agencies are allowed to bid.

Once these are determined, the opportunity analyzer (254) may use the RTB domain layer (504) to translate terrestrial broadcast specific values into their digital DSP (210) equivalent. Note that the bid scheduler (506) may provide the same functionality as the auction scheduler (252) in FIG. 2B.

Figure 6:
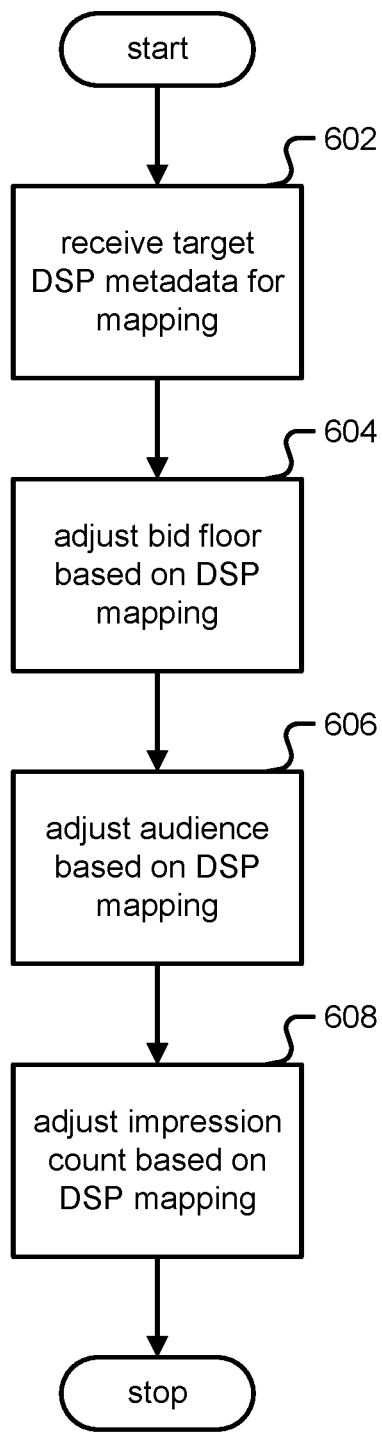
FIG. 6 is a flow diagram illustrating an embodiment of a process for serving bids as a bridge to a digital demand side platform using protocol translation.

FIG. 6 is a flow diagram illustrating an embodiment of a process for serving bids as a bridge to a digital demand side platform using protocol translation. In one embodiment, the flow of FIG. 6 is carried out by a portion of, one, or more computer/systems of FIG. 1, for example the opportunity analyzer (254)/RTB domain (504) in FIG. 5.

In step (602), a target DSP (210) metadata for mapping is received, for example by opportunity analyzer (254). An example target DSP metadata may include: "people intending to purchase an auto in San Francisco" with a bid floor of "$0.05 cost per impression" for a maximum of "50,000 impressions". The steps of (604), (606), and/or (608) are examples without limitation of mapping the target DSP metadata in step (602) to terrestrial broadcast inventory.

In step (604), a bid floor is adjusted based on the DSP mapping. By contrast to digital streaming and/or podcasts where bid floors are expressed in impressions, linear/terrestrial broadcast has historically been expressed in GRP (gross ratings point). For the example above, a bid floor of "$0.05 cost per impression" may be mapped to a GRP of 10.2. In one embodiment, the GRP is based on a model, which is constructed based at least in part on external ratings, for example from Nielsen ratings/unified audience data, and/or internal targeting information, for example from a radio mobile app.

In step (606), an audience target is adjusted based on the DSP mapping. By contrast to digital streaming and/or podcasts where audience is expressed in a fine granularity based on digitally targeted groups, linear/terrestrial broadcast may have fewer degrees of freedom, being geographically tied to the broadcast range of the radio tower, with a broader content genre being played during a day. For the example above, an audience of "people intending to purchase an auto in San Francisco" may be mapped to a set of radio stations including an 80s radio station in San Francisco with favorable demographics for an "auto intender".

In step (608), an impression count is adjusted based on the DSP mapping. By contrast to digital streaming and/or podcasts where impressions are sequential in time and deterministic by identity, the nature of linear/terrestrial broadcast has impressions that are parallel in time and anonymous. For the example above, the maximum of "50,000 impressions" may be mapped to three AM commute dayparts for a given set of station.

Figure 7:
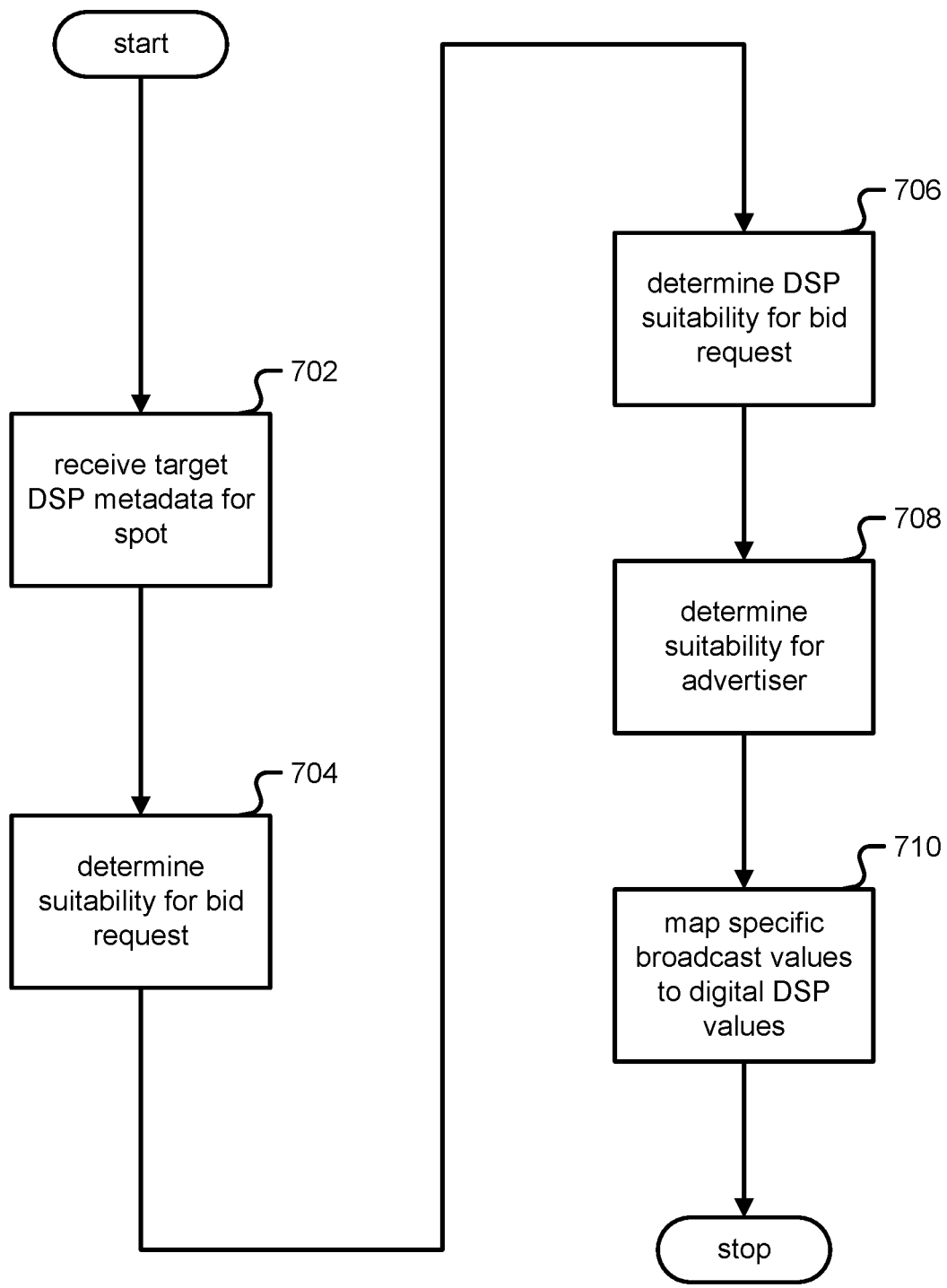
FIG. 7 is a flow diagram illustrating an embodiment of a process for analyzing a spot for digital suitability.

FIG. 7 is a flow diagram illustrating an embodiment of a process for analyzing a spot for digital suitability. In one embodiment, the flow of FIG. 7 is carried out by a portion of, one, or more computer/systems of FIG. 1, for example the opportunity analyzer (254)/RTB domain (504) in FIG. 5. In one embodiment, the flow of FIG. 7 is included in step (406) in FIG. 4.

In step (702), a target DSP (210) metadata for a spot is received, for example by opportunity analyzer (254). An example target DSP metadata may include: "people intending to purchase an auto in San Francisco" with a bid floor of "$0.05 cost per impression" for a maximum of "50,000 impressions". The steps of (704), (706), and/or (708), are examples without limitation of determining suitability to map the target DSP metadata in step (702) to terrestrial broadcast inventory.

In step (704), the spot is analyzed for suitability for the bid request. In one embodiment, the process of FIG. 6 is used with metadata at least in part to provide such analysis. At the end of step (704) a decision may be made whether to send the bid request or not. In step (706), the DSP (210) is analyzed for bid request suitability. In one embodiment, the DSP suitability is based at least in part on metadata. At the end of step (706) a decision may be made as to which DSPs will be sent the bid request.

In step (708), the advertisers and agencies are analyzed for bid request suitability. In one embodiment, this suitability is based at least in part on metadata. At the end of step (708) a decision may be made as to which advertiser and/or agencies will be sent the bid request. In step (710), with the decisions made in steps (704)-(708) the RTB domain layer (504) and/or opportunity analyzer (254) may be used to translate terrestrial broadcast specific values into their DSP equivalent.

Figure 8:
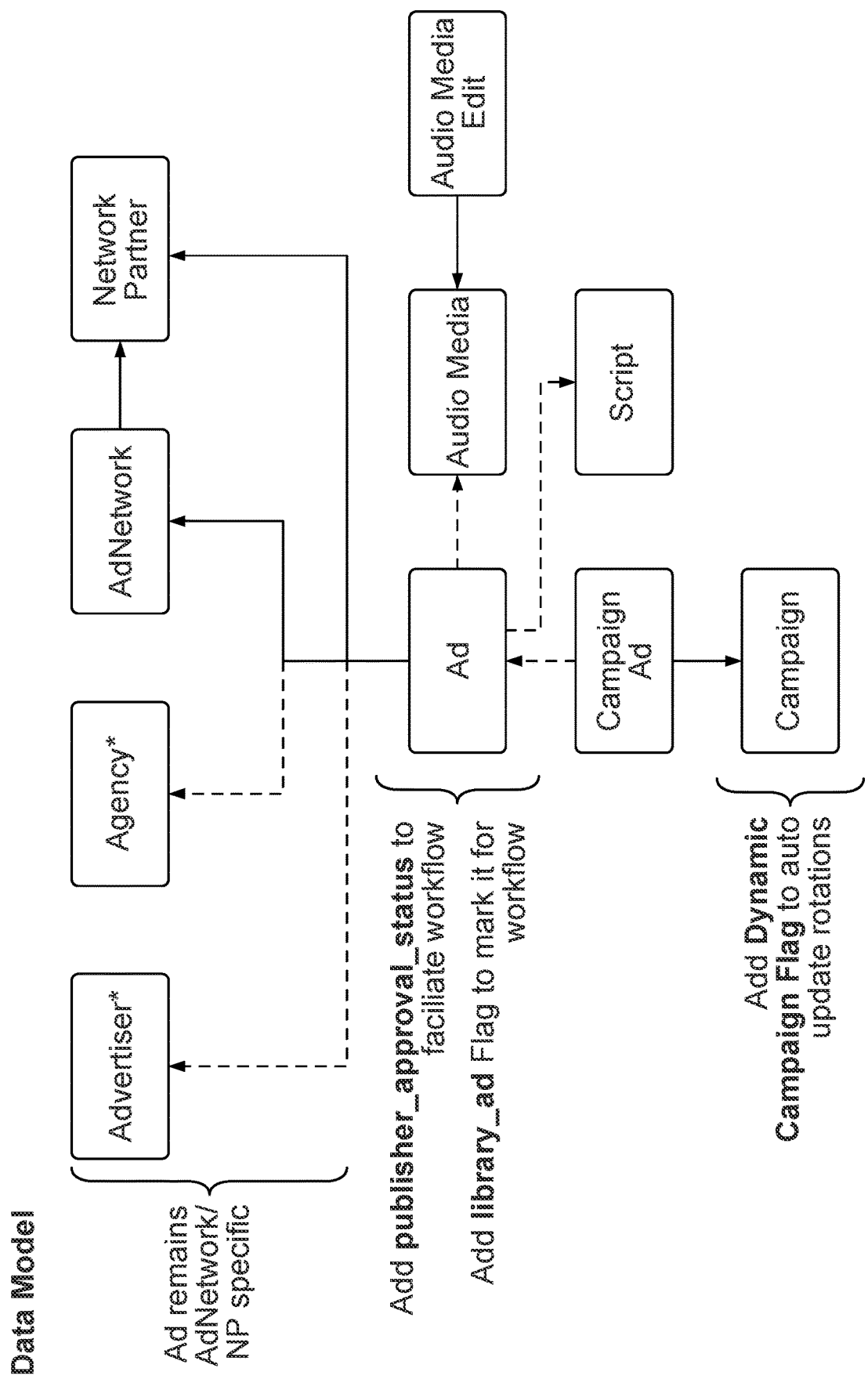
FIG. 8 is a block diagram illustrating an embodiment of a system for DSPs to dynamically adjust a creative for a terrestrial broadcast spot.
Figure 9:
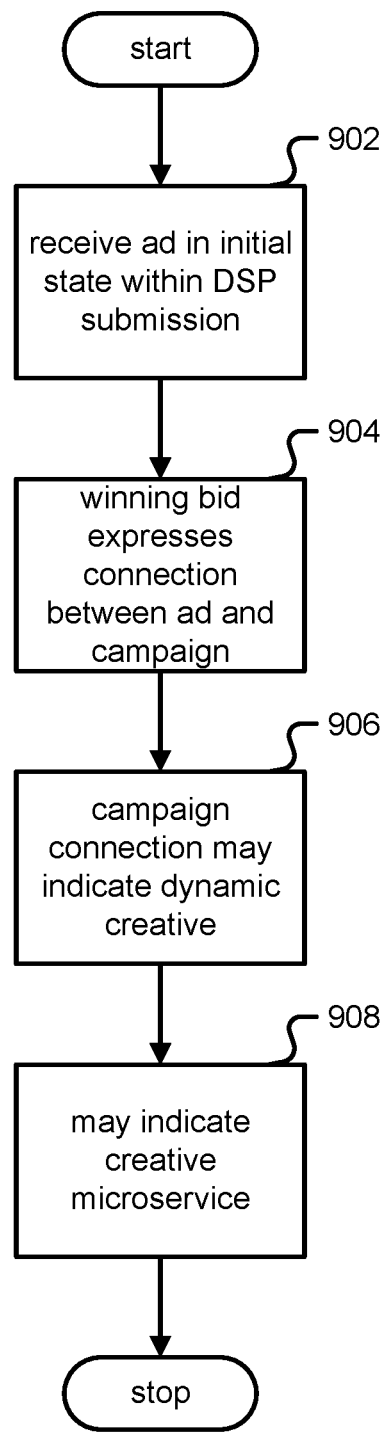
FIG. 9 is a flow diagram illustrating an embodiment of a process for DSPs to dynamically adjust a creative for a terrestrial broadcast spot.

FIG. 8 is a block diagram illustrating an embodiment of a system for DSPs to dynamically adjust a creative for a terrestrial broadcast spot. FIG. 9 is a flow diagram illustrating an embodiment of a process for DSPs to dynamically adjust a creative for a terrestrial broadcast spot. As shown in FIG. 8, a data model may be used that supports a concept of a creative that is available for a campaign. In step (902), a DSP (210) submits an ad in an initial state within a DSP submission. When approved, the state may change from beyond the initial state. In step (904), if and when the DSP (210) expresses in a winning bid that a known creative is to be played for the spot, a connection between the ad in step (902) and a campaign of FIG. 8 may be created.

In step (906), a signal is made available to indicate that a campaign allows for dynamic creatives. This may be implied if there are override records as described above. In step (908), a creative microservice may be used as well or as a replacement. In this case, media files may be stored elsewhere and referenced.

Figure 10:
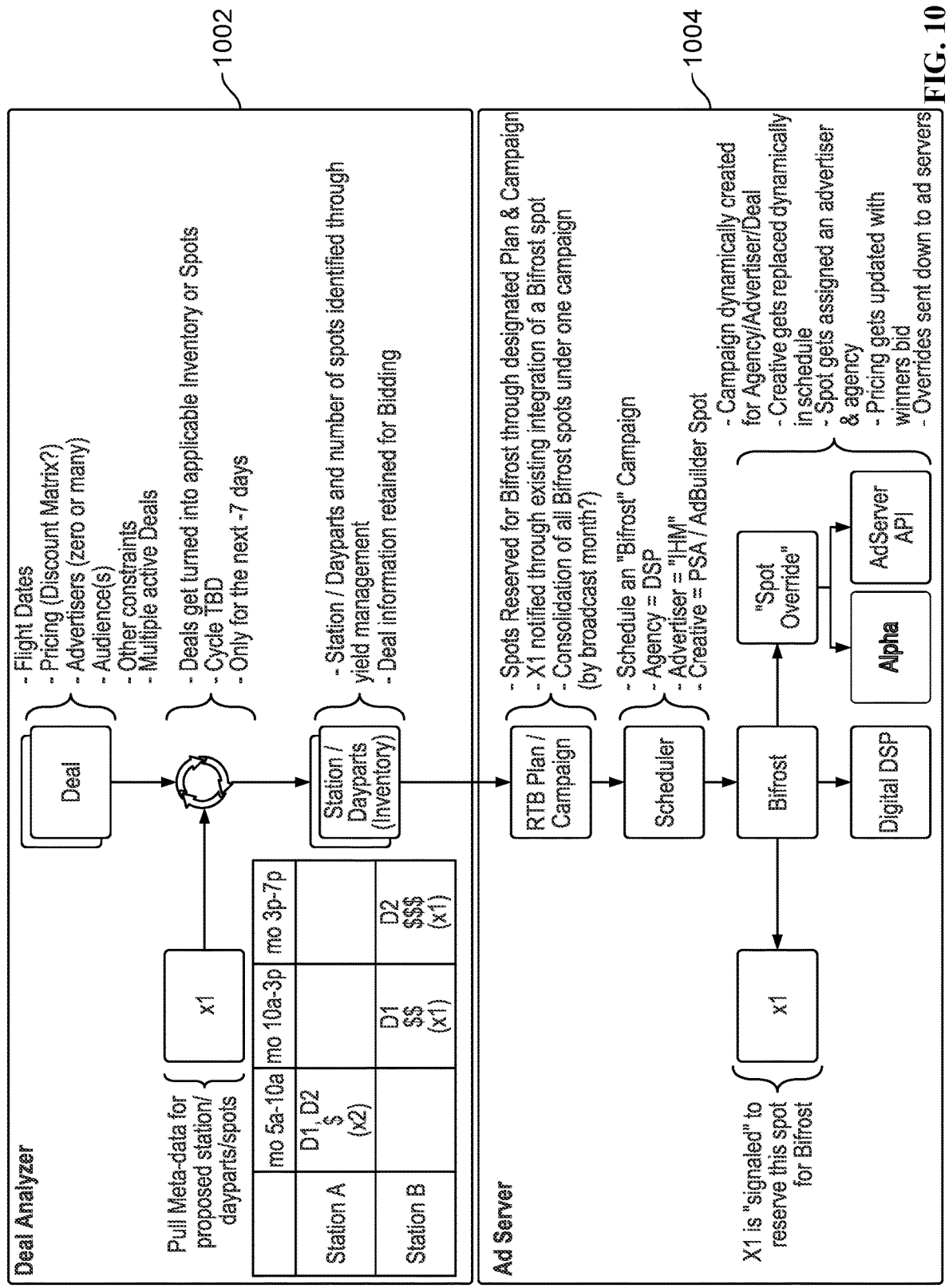
FIG. 10 is a block diagram illustrating an embodiment of a system for a bridged guaranteed deal.

FIG. 10 is a block diagram illustrating an embodiment of a system for a bridged guaranteed deal. In one embodiment, the Deal Analyzer block (1002) is carried out by the opportunity analyzer (254) in FIG. 2B, and the Ad Server (1004) is carried out by the broadcast ad server (204) in FIG. 2A.

As shown in FIG. 10, a guaranteed deal is presented to deal analyzer (1002) with one or more of the following: flight dates, pricing—which may include a discount matrix for volume pricing, advertisers, audience targets, other constraints, and a notation indicating whether multiple active deals are available from a given advertiser.

Metadata is pulled, for example as described in FIGS. 5, 6, and 7, to provide a set of proposed stations, dayparts, and/or spots that are available for terrestrial broadcast. Over a set cycle, for example for the next seven days, guaranteed deals are turned into applicable inventory and/or spots. Station, day parts, and the number of spots is identified through a yield management technique and the original deal information is retained for bidding. As shown in the example in FIG. 10, an example of inventory in order of pricing include: two guaranteed spots available in station A for the Monday 5 am-10 am ("morning commute") daypart, a guaranteed spot available in station B for the Monday 10 am-3 pm ("lunch/break") daypart, and a guaranteed spot available in station B for the Monday 3 pm-7 pm ("evening commute") daypart.

As shown in FIG. 10, the ad server (1004) may reserve the guaranteed spots for digital bridge through a designated plan and campaign. Terrestrial broadcast play out systems (206), (208) may be notified through an existing integration of a bridged spot. In one embodiment, consolidation of all bridged spots may occur under one campaign. A bridge campaign may be scheduled using a pre-signaled agency, advertiser, and/or creative. A play out system (206), (208) is signaled to reserve a spot for the bridge, and a campaign is dynamically created for a digital agency/advertiser/deal. The creative is replaced dynamically in schedule, the spot is assigned an advertiser an agency from the winning bid, and pricing is updated with the winner's bid. Overrides may be sent down to ad server (204).

Figure 11:
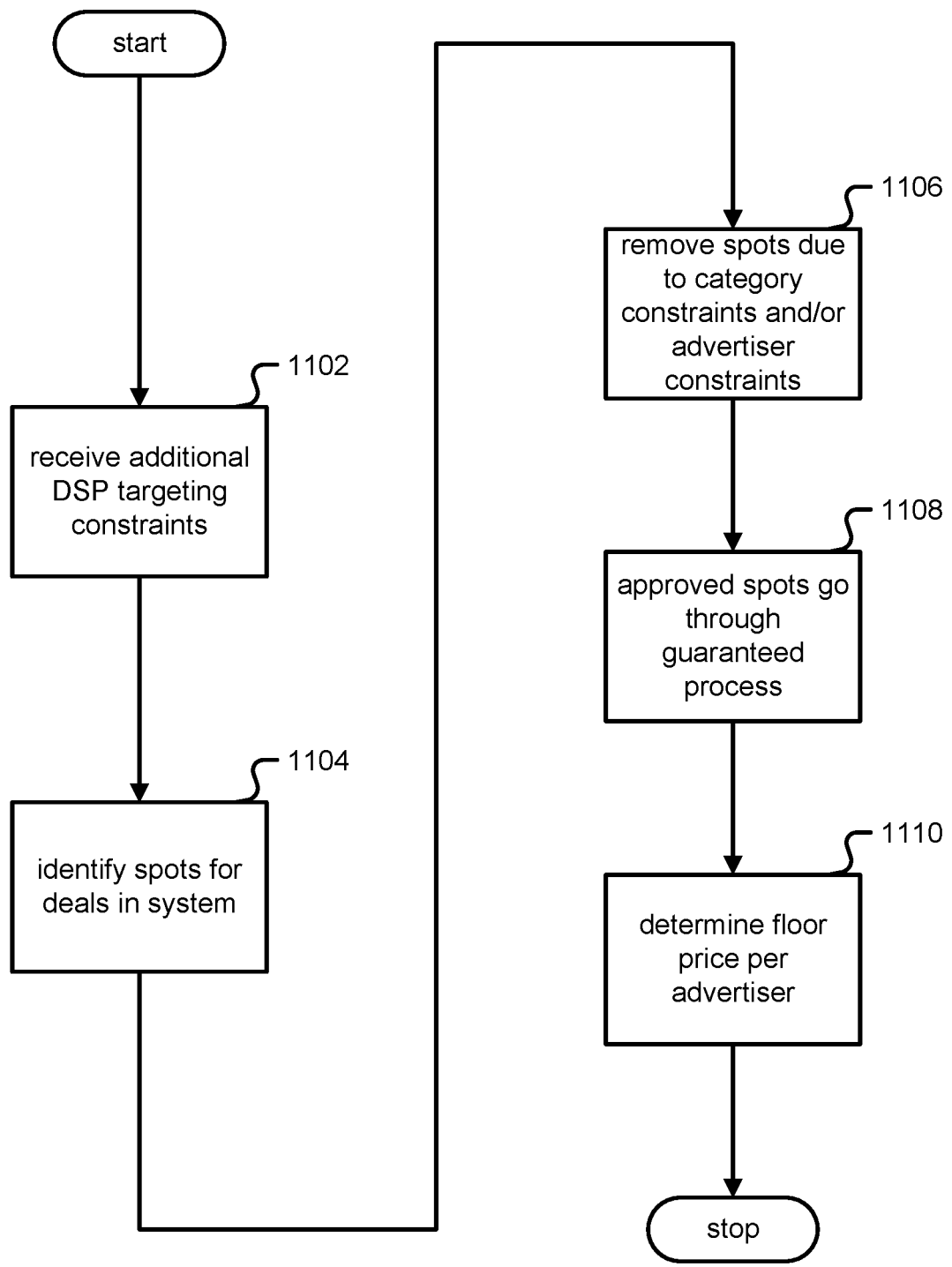
FIG. 11 is a flow diagram illustrating an embodiment of a process for a bridged non-guaranteed deal.

FIG. 11 is a flow diagram illustrating an embodiment of a process for a bridged non-guaranteed deal. In one embodiment, the flow of FIG. 11 is carried out by opportunity analyzer (254) and/or ad server (204) of FIG. 2B.

In step (1102), deals may be defined to hold more of the targeting constraints that DSPs (210) are accustomed to and/or traditionally entitled to. These deals identify the impressions and price to offer. In step (1104), the opportunity analyzer (254) identifies spots that fit a deal in the system. These spots may be placed into the system for bidding.

In step (1106), due to there being tighter integration with play out systems (206), (208), shown as "X1" in FIG. 10, constraints of the spot are assessed before a DSP (210) is allowed to bid. Play out system X1 (206), (208) may remove spots due to category and advertiser constraints, and may share this information before sending it to an external DSP (210).

In step (1108), once the spots are approved, they may go through the process described for guaranteed deals in FIG. 10. In step (1110), the floor price per advertiser, in the event multiple advertisers are allowed to bid, may be determined. In one embodiment, a pricing matrix and/or empirical data helps calculate this.

Figure 12:
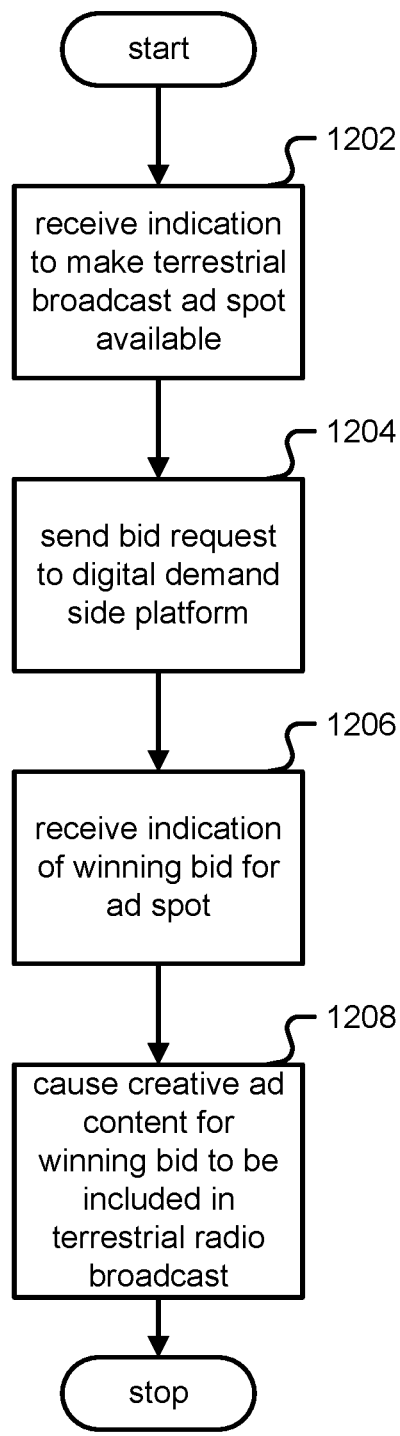
FIG. 12 is a flow diagram illustrating an embodiment of a process for exposing broadcast ad spots for bid.

FIG. 12 is a flow diagram illustrating an embodiment of a process for exposing broadcast ad spots for bid. In one embodiment, the process of FIG. 4 is carried out by a portion of, one, or more computer/systems of FIG. 1, for example the bridge bid server (214) in FIG. 2A.

In step (1202), an indication to make a terrestrial broadcast ad spot associated with a terrestrial broadcast available for bid via a digital demand side platform is received. In one embodiment, the digital demand side platform is one of a plurality of demand side platforms. In one embodiment, the terrestrial broadcast ad spot is prepaid by the digital demand side platform. In one embodiment, the terrestrial broadcast ad spot is reserved by the digital demand side platform. In one embodiment, the terrestrial broadcast ad spot is auctioned in advance for later broadcast.

In step (1204), a bid request to the digital demand side platform, via the communication interface, is sent based at least in part on the indication. In one embodiment, the bid request is sent concurrently to each of the plurality of demand side platforms. In one embodiment, the bid request is sent sequentially to each of the plurality of demand side platforms.

In one embodiment, terrestrial broadcast values are mapped into digital attributes for the digital demand side platform. In one embodiment, mapping comprises translating terrestrial broadcast gross rating points and digital impressions. In one embodiment, translating comprises assessing impressions of an appropriate demographic population. In one embodiment, mapping comprises translating terrestrial broadcast pricing and digital pricing. In one embodiment, mapping comprises translating terrestrial broadcast audience targeting and digital audience targeting.

In one embodiment, the bid request is for a guaranteed impression. In one embodiment, an additional spot in the event the terrestrial broadcast ad spot is missed is provided. In one embodiment, the bid request is for a non-guaranteed impression. In one embodiment, the bid request is for an evergreen transaction.

In step (1206), an indication of a winning bid for the terrestrial broadcast ad spot is received. In step (1208), a creative ad content associated with the winning bid is caused to be included in the terrestrial broadcast at a time associated with the terrestrial broadcast ad spot. In one embodiment, the creative ad content is identified by a creative identifier associated with preapproved content. In one embodiment, reporting metrics to the digital demand side platform are sent.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a network interface;
    an audio interface coupled to the network interface, wherein the audio interface
    comprises an STL (studio/transmitter link) input of a terrestrial radio broadcast mixer in a radio tower and an AES (Audio Engineering Society) standard conforming output of the terrestrial radio broadcast mixer; and
    a processor coupled to the network interface and configured to:
        receive by the processor an opportunity analyzer indication to make a terrestrial broadcast ad spot associated with a terrestrial broadcast available for bid via a digital demand side platform;
        send a bid request to the digital demand side platform using an RTB (real-time bidding) protocol, via the communication interface, based at least in part on the opportunity analyzer indication;
        wherein sending the bid request comprises adjusting an audience target based at least in part on expressing audience geographically tied to a broadcast range of radio towers;
        receive a bid response from the digital demand side platform using the RTB protocol;
        convert the bid response from the digital demand side platform to a converted bid response for terrestrial broadcast, based at least in part on mapping digital metadata to terrestrial broadcast inventory;
        receive an indication of a winning bid for the terrestrial broadcast ad spot;
        dynamically adjust a creative ad content for the terrestrial broadcast ad spot, wherein the creative ad content is associated with the bid response from the digital demand side platform, at least in part by using a bridge creative service to make digital creative suitable for terrestrial broadcast in part by following current governmental requirements; and
        broadcast the creative ad content associated with the winning bid in the terrestrial broadcast at a time associated with the terrestrial broadcast ad spot using the audio interface.

2. The system of claim 1, wherein the digital demand side platform is one of a plurality of demand side platforms.

3. The system of claim 2, wherein the bid request is sent concurrently to each of the plurality of demand side platforms.

4. The system of claim 2, wherein the bid request is sent sequentially to each of the plurality of demand side platforms.

5. The system of claim 1, wherein the terrestrial broadcast ad spot is prepaid by the digital demand side platform.

6. The system of claim 1, wherein the terrestrial broadcast ad spot is reserved by the digital demand side platform.

7. The system of claim 1, wherein the terrestrial broadcast ad spot is auctioned in advance for later broadcast.

8. The system of claim 1, wherein the creative ad content is identified by a creative identifier associated with preapproved content.

9. The system of claim 1, wherein the processor is further configured to map terrestrial broadcast values into digital attributes for the digital demand side platform.

10. The system of claim 9, wherein mapping comprises translating terrestrial broadcast gross rating points and digital impressions.

11. The system of claim 10, wherein translating comprises assessing impressions of an appropriate demographic population.

12. The system of claim 9, wherein mapping comprises translating terrestrial broadcast pricing and digital pricing.

13. The system of claim 9, wherein mapping comprises translating terrestrial broadcast audience targeting and digital audience targeting.

14. The system of claim 1, wherein the processor is further configured to send reporting metrics to the digital demand side platform.

15. The system of claim 1, wherein the bid request is for a guaranteed impression.

16. The system of claim 15, wherein the processor is further configured to provide an additional spot in the event the terrestrial broadcast ad spot is missed.

17. The system of claim 1, wherein the bid request is for a non-guaranteed impression.

18. The system of claim 17, wherein the bid request is for an evergreen transaction.

19. A method, comprising:
    receiving by a processor an opportunity analyzer indication to make a terrestrial broadcast ad spot associated with a terrestrial broadcast available for bid via a digital demand side platform;
    sending a bid request to the digital demand side platform using an RTB (real-time bidding) protocol based at least in part on the opportunity analyzer indication;
    wherein sending the bid request comprises adjusting an audience target based at least in part on expressing audience geographically tied to a broadcast range of radio towers;
    receiving a bid response from the digital demand side platform using the RTB protocol;
    converting the bid response from the digital demand side platform to a converted bid response for terrestrial broadcast, based at least in part on mapping digital metadata to terrestrial broadcast inventory;
    receiving an indication of a winning bid for the terrestrial broadcast ad spot;
    dynamically adjusting a creative ad content for the terrestrial broadcast ad spot, wherein the creative ad content is associated with the bid response from the digital demand side platform, at least in part by using a bridge creative service to make digital creative suitable for terrestrial broadcast in part by following current governmental requirements; and
    broadcasting the creative ad content associated with the winning bid in the terrestrial broadcast at a time associated with the terrestrial broadcast ad spot using an audio interface, wherein the audio interface comprises an STL (studio/transmitter link) input of a terrestrial radio broadcast mixer in a radio tower and an AES (Audio Engineering Society) standard conforming output of the terrestrial radio broadcast mixer.

20. A computer program product embodied in a non-transitory computer readable medium and comprising computer instructions for:
- receiving by a processor an opportunity analyzer indication to make a terrestrial broadcast ad spot associated with a terrestrial broadcast available for bid via a digital demand side platform;
- sending a bid request to the digital demand side platform using an RTB (real-time bidding) protocol based at least in part on the opportunity analyzer indication;
- wherein sending the bid request comprises adjusting an audience target based at least in part on expressing audience geographically tied to a broadcast range of radio towers;
- receiving a bid response from the digital demand side platform using the RTB protocol;
- converting the bid response from the digital demand side platform to a converted bid response for terrestrial broadcast, based at least in part on mapping digital metadata to terrestrial broadcast inventory;
- receiving an indication of a winning bid for the terrestrial broadcast ad spot;
- dynamically adjusting a creative ad content for the terrestrial broadcast ad spot, wherein the creative ad content is associated with the bid response from the digital demand side platform, at least in part by using a bridge creative service to make digital creative suitable for terrestrial broadcast in part by following current governmental requirements; and
- broadcasting the creative ad content associated with the winning bid in the terrestrial broadcast at a time associated with the terrestrial broadcast ad spot using an audio interface, wherein the audio interface comprises an STL (studio/transmitter link) input of a terrestrial radio broadcast mixer in a radio tower and an AES (Audio Engineering Society) standard conforming output of the terrestrial radio broadcast mixer.

* * * * *